(12) United States Patent
Sgroi, Jr. et al.

(10) Patent No.: US 8,636,961 B2
(45) Date of Patent: Jan. 28, 2014

(54) FUELS FOR HYDROGEN GENERATING CARTRIDGES

(75) Inventors: Anthony Sgroi, Jr., Wallingford, CT (US); Constance R. Stepan, Oxford, CT (US); Andrew J. Curello, Hamden, CT (US); Michael Curello, Cheshire, CT (US)

(73) Assignee: Societe BIC, Clichy Cedex (FR)

( * ) Notice: Subject to any disclaimer, the term of this patent is extended or adjusted under 35 U.S.C. 154(b) by 1287 days.

(21) Appl. No.: 11/917,234

(22) PCT Filed: Jun. 12, 2006

(86) PCT No.: PCT/US2006/023024
§ 371 (c)(1),
(2), (4) Date: Jul. 17, 2008

(87) PCT Pub. No.: WO2006/135895
PCT Pub. Date: Dec. 21, 2006

(65) Prior Publication Data
US 2009/0123342 A1    May 14, 2009

Related U.S. Application Data

(60) Provisional application No. 60/689,572, filed on Jun. 13, 2005.

(51) Int. Cl.
*B01J 7/00* (2006.01)
*C01B 3/02* (2006.01)
*C01B 6/15* (2006.01)
*C01B 6/24* (2006.01)

(52) U.S. Cl.
USPC ............... 422/236; 48/61; 422/107; 422/112; 422/129; 422/238; 423/644; 423/648.1; 423/657

(58) Field of Classification Search
None
See application file for complete search history.

(56) References Cited

U.S. PATENT DOCUMENTS

| | | |
|---|---|---|
| 2,534,533 A | 12/1950 | Schlesinger et al. |
| 3,159,506 A | 12/1964 | Saiathe et al. |
| 3,313,598 A | 4/1967 | Gluckstein |
| 4,155,712 A | 5/1979 | Taschek |
| 6,989,210 B2 | 1/2006 | Gore |
| 7,727,293 B2 | 6/2010 | Rosenzweig et al. |

(Continued)

FOREIGN PATENT DOCUMENTS

| | | | |
|---|---|---|---|
| GB | 2165532 A | * | 4/1986 |
| JP | 10064572 A | | 3/1998 |

(Continued)

OTHER PUBLICATIONS

International Search Report and Written Opinion issued in connection with parent application PCT/US2006/023024 on Jan. 24, 2008.

(Continued)

*Primary Examiner* — Melvin C Mayes
*Assistant Examiner* — Colin W Slifka
(74) *Attorney, Agent, or Firm* — The H.T. Than Law Group

(57) ABSTRACT

The present invention increases the amount of hydrogen produced or released from reactions between a metal hydride fuel and liquid reactant. The present invention also decreases the volume of a hydrogen generating cartridge by reducing the pH of the liquid reactant.

10 Claims, 10 Drawing Sheets

(56) References Cited

U.S. PATENT DOCUMENTS

| | | |
|---|---|---|
| 2001/0022960 A1 | 9/2001 | Kojima et al. |
| 2004/0009379 A1 | 1/2004 | Amendola et al. |
| 2004/0033194 A1 | 2/2004 | Amendola et al. |
| 2004/0047801 A1 | 3/2004 | Petillo et al. |
| 2004/0214056 A1 | 10/2004 | Gore |
| 2005/0238573 A1 | 10/2005 | Zhang |
| 2005/0276748 A1 | 12/2005 | Morioka et al. |

FOREIGN PATENT DOCUMENTS

| | | | |
|---|---|---|---|
| JP | 2002080201 A | | 3/2002 |
| JP | 2002187595 A | | 7/2002 |
| JP | 2003017102 A | | 1/2003 |
| JP | 2004-244262 A | | 9/2004 |
| JP | 2004327199 A | | 11/2004 |
| WO | WO 2004065292 A2 | * | 8/2004 |
| WO | 2005049485 A1 | | 6/2005 |

OTHER PUBLICATIONS

H.I. Schlesinger et al. Sodium Borohydride, Its Hydrolysis and its Use as a Reducing Agent and in the Generation of Hydrogen. Jan. 5, 1953. p. 215-219. vol. 75. University of Chicago.

Translated Abstract for JP 2004-244262 to Yasuharu.

Extended European Search Report issued in connection with the corresponding European Patent Application No. 06773066.3 on Apr. 10, 2012.

Machine Translation of JP 2004327199 A to Tamachi et al.

Machine Translation of JP 10-064572 A to Hado et al.

Machine Translation of JP 2003-017102 A to Yoneda et al.

Machine Translation of JP 2002-080201 A to Kojima et al.

Machine Translation of JP 2002187595 A to Yokoyama.

* cited by examiner

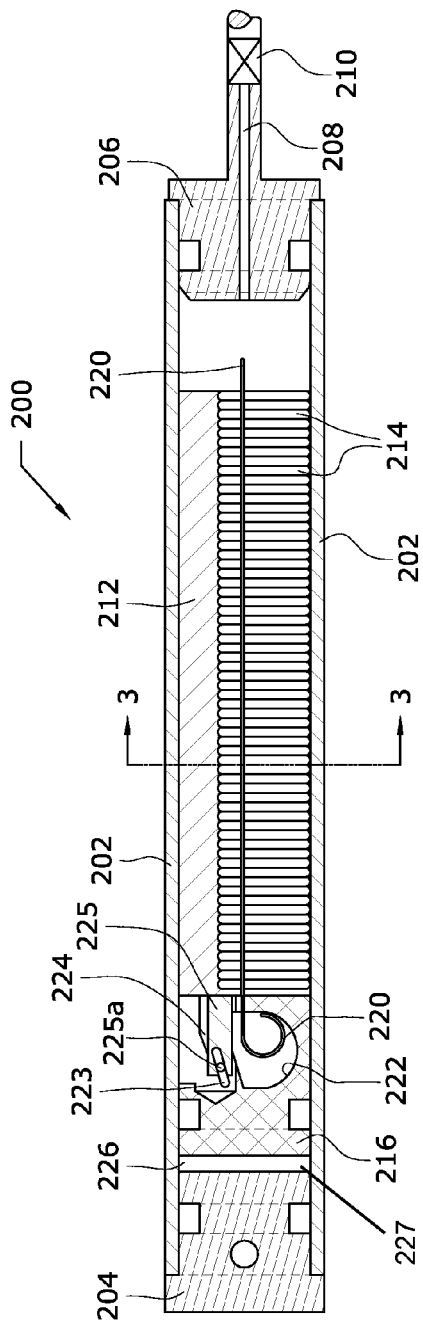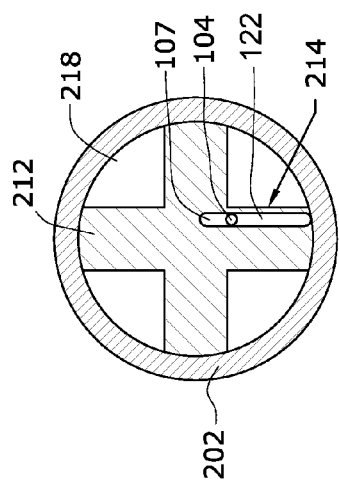

FUELS FOR HYDROGEN GENERATING CARTRIDGES

CROSS REFERENCE TO RELATED APPLICATIONS

This application is a national phase application under 35 U.S.C. §371 of International Application No. PCT/US2006/023024 filed on Jun. 12, 2006, which claims priority to U.S. Provisional Application No. 60/689,572 filed on Jun. 13, 2005. The parent cases are incorporated by reference herein in their entirety.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated by reference herein in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Chemical metal hydride fuels are promising due to their relatively higher energy density, i.e., amount of hydrogen per mass or volume of fuel. In a chemical metal hydride fuel cell, sodium borohydride is reformed and reacts as follows:

$$NaBH_4 + 2H_2O \rightarrow \text{(heat or catalyst)} \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum, ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated by reference herein in its entirety.

Despite the potential benefits of higher energy density, chemical metal hydride fuels have not achieved the desired energy density for use with portable electronic devices including the amount of hydrogen that can be released from the fuel. Hence, there remains a need to reduce the energy density and maximize the release of hydrogen in chemical metal hydride fuels.

SUMMARY OF THE INVENTION

The present invention increases the amount of hydrogen produced or released from metal hydride fuels.

The present invention also decreases the volume of a hydrogen generating cartridge.

BRIEF DESCRIPTION OF THE DRAWING

In the accompanying drawings, which forms a part of the specification, and is to be read in conjunction therewith and in which like reference numerals are used to indicate like parts:

FIG. 2 is a cross-sectional view of another apparatus usable with the present invention; and FIG. 3 is a cross-sectional view of the apparatus of FIG. 2 along line 3-3.

DETAILED DESCRIPTION OF THE INVENTION

Figure 1:
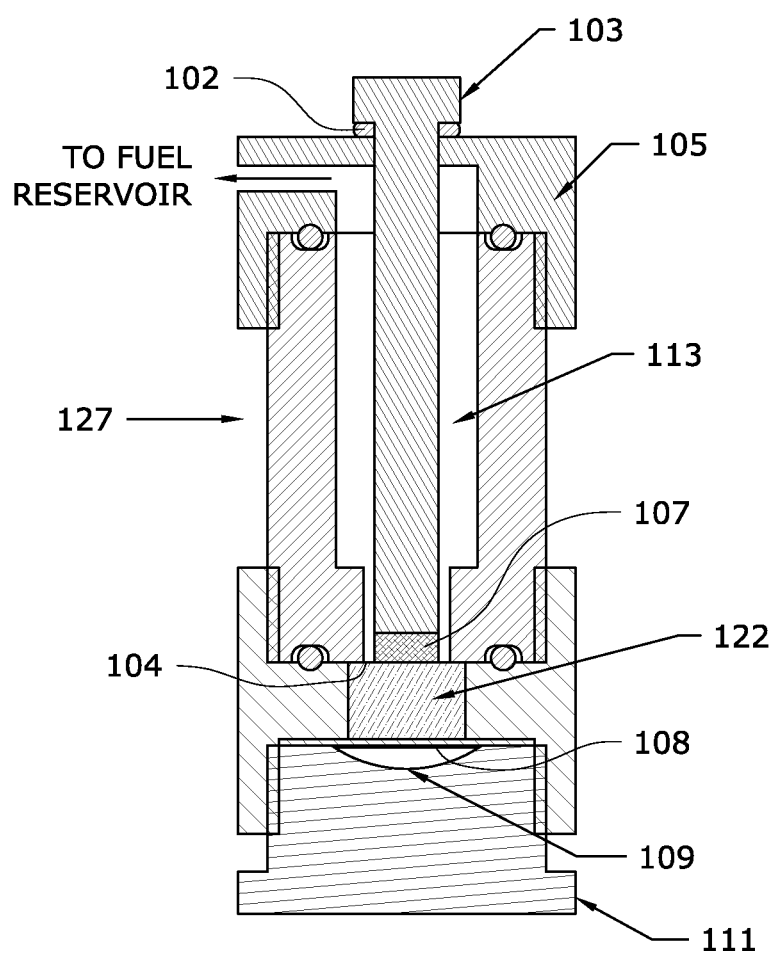
FIG. 1 is a cross-sectional view of an apparatus usable with the release of hydrogen from metal hydride fuels.

As illustrated in the accompanying drawing and discussed in detail below, the present invention is directed to methods and compositions capable of maximizing the release of hydrogen from chemical hydride fuels, such as sodium borohydride ($NaBH_4$), and water. The present invention is also directed to an apparatus that maximizes the release of hydrogen fuels from a reaction of chemical hydride fuels and water.

Suitable known hydrogen generating apparatus using metal hydride fuels are disclosed in co-pending U.S. application Ser. No. 10/679,756, filed on Oct. 6, 2003; U.S. application Ser. No. 10/854,540, filed on May 26, 2004; U.S. application Ser. No. 11/067,167, filed on Feb. 25, 2005; and U.S. application Ser. No. 11/066,573, filed on Feb. 25, 2005. The disclosures of these references are incorporated by reference herein in their entireties.

Suitable chemical metal hydride fuels include, but are not limited to, hydrides of elements of Groups IA-IVA of the Periodic Table of Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$ or $Mg(BH_4)_2$. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. When an aqueous form of $NaBH_4$ is utilized, the chamber containing the aqueous $NaBH_4$ also includes a stabilizer. Exemplary stabilizers can include, but are not limited to, metals and metal hydroxides, such as alkali metal hydroxides. Examples of such stabilizers are described in U.S. Pat. No. 6,683,025, which is incorporated by reference herein in its entirety. Preferably, the stabilizer is NaOH.

The solid form of the hydrogen-bearing fuel is preferred over the aqueous form. In general, solid fuels are more advantageous than liquid fuels, because the aqueous fuels contain proportionally less energy than the solid fuels and the liquid fuels are less stable than the solid fuels. Accordingly, the most preferred fuel for the present invention is solid sodium borohydride in pelleted, granular, powdered or agglomerated powder form.

According to the present invention, a liquid reactant reacts with the chemical metal hydride fuel in the presence of an optional catalyst to generate hydrogen. Preferably, suitable liquid reactants include, but are not limited to, water, alcohols, and/or dilute acids. The most common liquid reactant is water. As indicated above and in the formulation below, water may react with a hydrogen-bearing fuel, such as $NaBH_4$ in the presence of an optional catalyst, acids and additives to generate hydrogen.

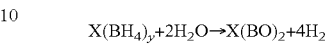

Where X includes, but is not limited to, Na, Mg, Li, K and all alkaline metals, and y is an integer.

The reactant also includes optional additives that reduce or increase the pH of the solution. The pH of the reactant can be used to determine the speed at which hydrogen is produced. For example, additives that reduce the pH of the reactant result in a higher rate of hydrogen generation. Such additives include, but are not limited to, acids, such as hydrochloric acid (HCl), nitric acid ($HNO_3$), acetic acid ($HC_2H_3O_2$), sulfuric acid ($H_2SO_4$), citric acid ($H_3C_6H_5O_7$), carbonic acid ($H_2CO_3$), phosphoric acid ($H_3PO_4$) and oxalic acid ($H_2C_2O_4$), among others. Conversely, additives that raise the pH, i.e., basic compounds, can lower the reaction rate to the point where almost no hydrogen evolves. The solution of the present invention can have any pH value less than 7, such as a pH of from about 0.01 to about 6 and, preferably, from about 0.1 to about 3.0. The effects of lowering the pH are discussed below.

In some exemplary embodiments, the reactant optionally includes a catalyst that can initiate and/or facilitate the production of hydrogen gas by increasing the rate at which the reactant reacts with the fuel component. This optional catalyst can have any shape or size, and can be in any state (liquid, solid or vapor). For example, the catalyst can be small enough to form a powder, or it can be as large as the reaction chamber. In some exemplary embodiments, the catalyst forms a catalyst bed. The catalyst can be located inside the reaction chamber or proximate to the reaction chamber, as long as at least one of either the reactant or the fuel component comes into contact with the catalyst.

The catalyst of the present invention may include one or more transitional metals from Group VIIIB of the Periodic Table of Elements. For example, the catalyst may include transitional metals such as iron (Fe), cobalt (Co), nickel (Ni), ruthenium (Ru), rhodium (Rh), platinum (Pt), palladium (Pd), osmium (Os) and iridium (Ir). Additionally, transitional metals in Group IB, i.e., copper (Cu), silver (Ag) and gold (Au), and in Group IIB, i.e., zinc (Zn), cadmium (Cd) and mercury (Hg), may also be used in the catalyst of the present invention. The catalyst may also include other transitional metals including, but not limited to, scandium (Sc), titanium (Ti), vanadium (V), chromium (Cr) and manganese (Mn). Transition metal catalysts useful in the present invention are described in U.S. Pat. No. 5,804,329, which is incorporated by reference herein in its entirety.

Some of the catalysts of the present invention can generically be defined by the following formula:

wherein M is the cation of the transition metal, X is the anion, and "a" and "b" are integers from 1 to 6 as needed to balance the charges of the transition metal complex.

Suitable cations of the transition metals include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$), rhodium (IV) ($Rh^{4+}$), rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium (VIII) ($Os^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$, zinc ($Zn^{2+}$), cadmium ($Cd^{2+}$), mercury (I) ($Hg^+$), mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_4^-$), dihydrogen phosphate ($H_2PO_4^-$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like.

A preferred catalyst of the present invention is $CoCl_2$.

In some exemplary embodiments, an optional additive may be included in the reactant and/or in the reaction chamber. This optional additive is any composition that is capable of substantially preventing the freezing of or reducing the freezing point of the reactant and/or the fuel component. In some exemplary embodiments, the additive can be an alcohol-based composition, such as an anti-freezing agent. Preferably, the additive of the present invention is methanol ($CH_3OH$). Other suitable anti-freezing agents include, but are not limited to, ethanol ($CH_3CH_2OH$) and n-propanol (such as 1-propanol ($CH_3CH_2CH_2OH$) or 2-propanol ($CH_3CHOHCH_3$)). Higher alcohols are also usable, but are less preferred due to their lower solubility in water. Such higher alcohols include butanol ($CH_3CH_2CH_2CH_2OH$), pentanol ($CH_3CH_2CH_2CH_2CH_2OH$) and hexanol ($CH_3CH_2CH_2CH_2CH_2CH_2OH$). However, as stated above, any additive capable of reducing the freezing point of the reactant and/or the fuel component may be used. Additives to increase or decrease the vapor point or boiling point can also be used.

In the discussion below, sodium borohydride is used for illustration purpose only. The present invention can be applied to any fuel capable of releasing hydrogen, including the metal hydride fuels described above. The stoichiometric equation describing the reaction of sodium borohydride and water is as follows:

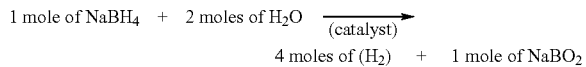

$$1 \text{ mole of } NaBH_4 + 2 \text{ moles of } H_2O \xrightarrow{\text{(catalyst)}} 4 \text{ moles of } (H_2) + 1 \text{ mole of } NaBO_2$$

This equation can be converted to a mass balance equation, so that for one gram of $NaBH_4$ an ideal amount of hydrogen fuel can be obtained, as follows:

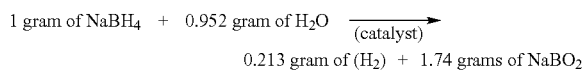

$$1 \text{ gram of } NaBH_4 + 0.952 \text{ gram of } H_2O \xrightarrow{\text{(catalyst)}} 0.213 \text{ gram of } (H_2) + 1.74 \text{ grams of } NaBO_2$$

The stoichiometric-to-mass conversation can be obtained by looking up the mass of each mole of the compounds in the stoichiometric equation and normalizing to 1 gram of sodium borohydride. The total mass on the left hand side of the equation should be the same as the total mass of the right hand side of the equation, as required by the conservation of mass principle. This is certainly true for the above mass balance equation, save for rounding uncertainty. It can also be seen that the ideal weight (or mass) ratio of solid sodium borohydride to water is 1:0.952 or close to 1:1.

Hence, to maximize the release of hydrogen in sodium borohydride, suitable release methods should approach 0.213 gram of hydrogen for 1.0 gram of sodium borohydride or for 0.952 gram of water. Examples were conducted to ascertain the efficiency of the sodium borohydride and water reaction. First, a liquid reactant was prepared using water, as the main reactant, cobalt chloride as the catalyst, and methanol as the anti-freezing substance in accordance to the following:

| | |
|---|---|
| Distilled $H_2O$ | 14.58 grams |
| $CH_3OH$ | 2.06 grams |
| $CoCl_2$ | 0.686 gram |
| Total | 17.326 grams |

This prepared liquid reactant has a pH of about 5.4.

In the two examples described below, first a small amount of the solid sodium borohydride is added to a much larger amount of prepared liquid reactant, and in the second example a small amount of prepared liquid reactant is added to a larger amount of solid sodium borohydride. In these examples, the smaller amounts of reactant or fuel are fully reacted.

FIRST EXAMPLE

A 0.1 gram dose of solid sodium borohydride solid reactant was added to 17.6 ml (17.326 grams) of the prepared liquid reactant. The weight ratio between sodium borohydride to liquid reactant is about 1:173 and to water is about 1:146. The calculations hereafter use the weight ratios between the solid sodium borohydride and the total liquid reactant, instead of the ratios between the solid sodium borohydride and water, because the hydrogen generating apparatus or cartridge also has to carry the catalysts, acids and anti-freezing agents.

Figure 4:
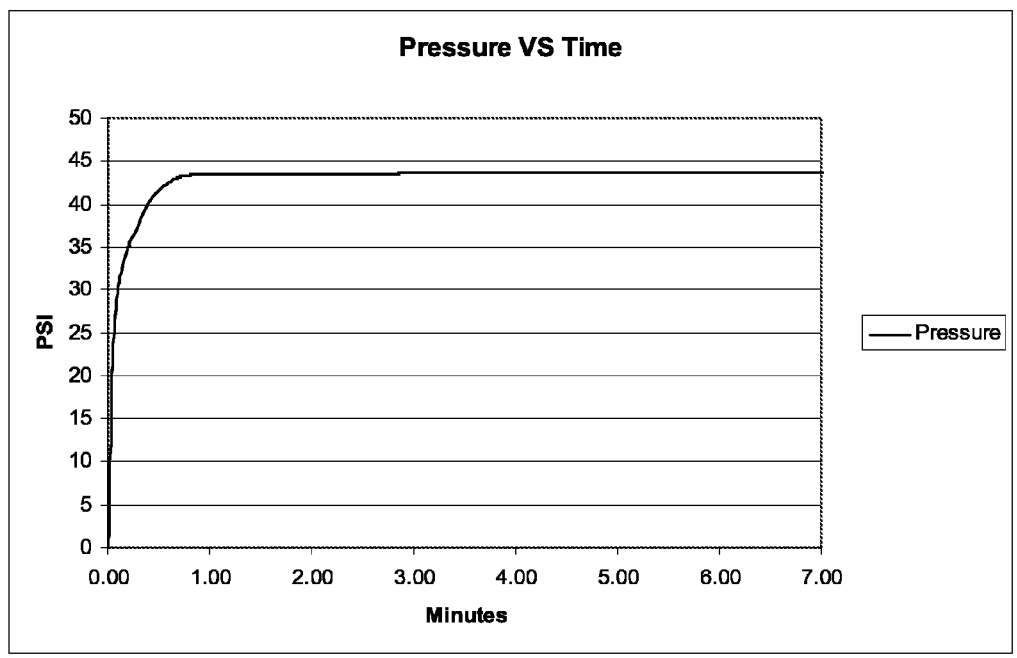
FIG. 4 shows the hydrogen pressure of a fixture over time in the First Example.

In this example, the volume of liquid was chosen to ensure that all of the available sodium borohydride is reacted, and the chosen volume is more than the volume required by the stoichiometric/mass balance equations discussed above. The reactants were placed in a fixture having a volume of 87.4 ml. Hence, the volume available for the hydrogen is substantially the difference between the volume of the fixture and the volumes of the reactants, or about 69.8 ml. After the sodium borohydride was added to and reacted with the prepared liquid reactant, the internal pressure of the fixture was measured using a pressure transducer. The measured pressure is shown in FIG. 4.

Figure 5:
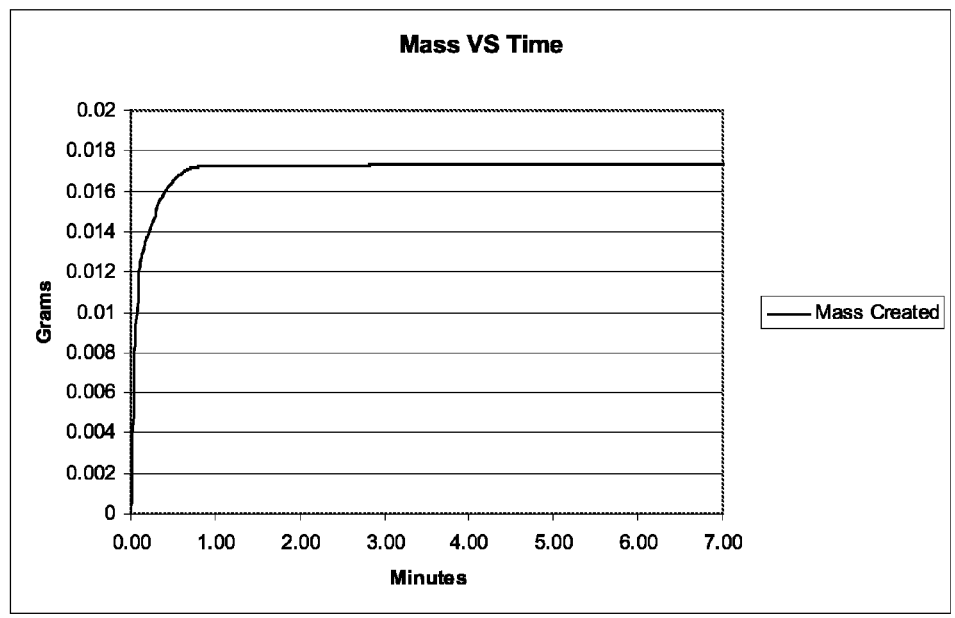
FIG. 5 shows the mass of hydrogen generated in a fixture over time in the First Example.

The maximum pressure within the fixture of 43.8 psi was reached within one minute after the reaction started. A similar curve showing the mass of hydrogen generated versus time, shown in FIG. 5, also shows that most of the mass was generated within the first minute.

Figure 6:
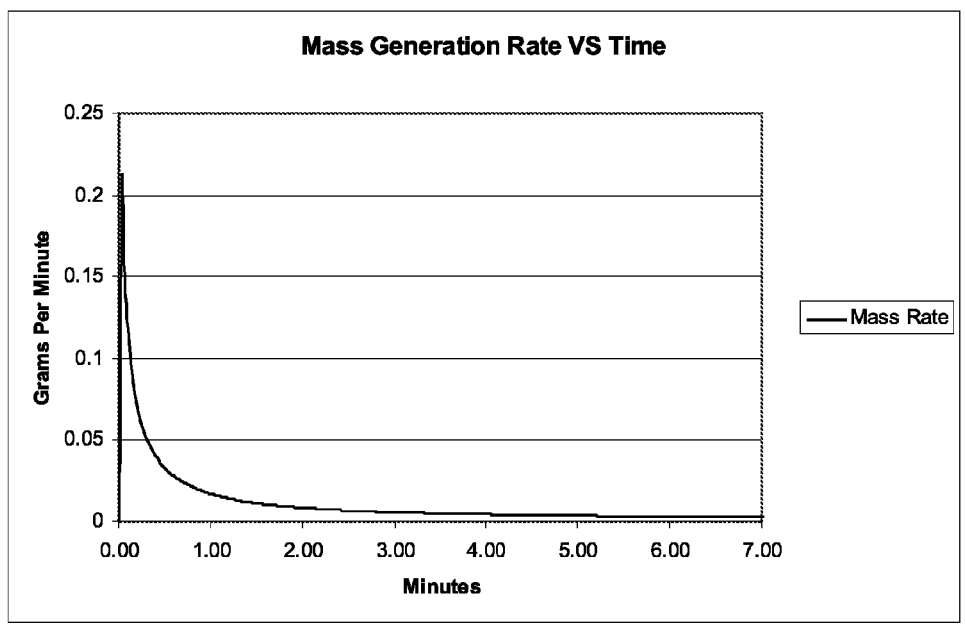
FIG. 6 shows the rate of mass generation over time in the First Example.

Mass is calculated from the pressure curve using the ideal gas equation, as shown below:

$$PV = mR_H T$$

wherein,
P=pressure
V=volume
m=mass of hydrogen
$R_H$=hydrogen gas constant=universal gas constant molecular weight of $H_2$
T=absolute temperature The rate of mass generation versus time is the derivative of the mass versus time curve, and is shown in FIG. 6.

This shows that most of the hydrogen mass is produced early after the reaction had started. Since the produced hydrogen is used by the fuel cells to power electrical equipment, another useful gauge is to ascertain the amount of hydrogen fuel available to power the fuel cells after a reaction between the reactants. The above three plots show that the hydrogen is produced quickly after the initial reaction and the reaction also substantially stops relatively quickly afterward. Quick production of hydrogen reduces the need to store or pressurize the produced hydrogen until the fuel cell can consume the fuel. The ability to stop the reaction quickly also reduces the pressure build up, particularly after the system shuts down. Additionally, when smaller doses of fuel are used, the size of the reaction chamber can also be reduced.

Figure 7:
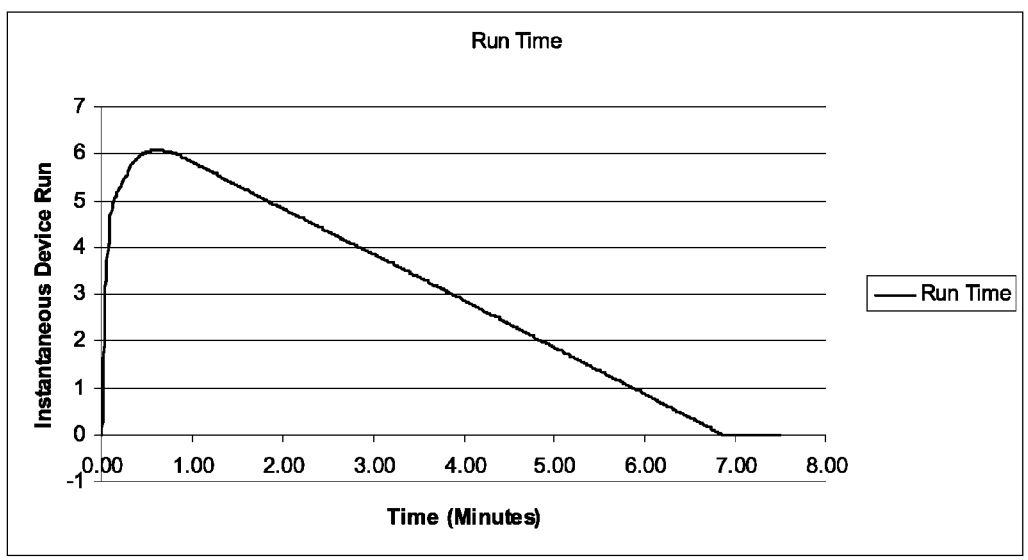
FIG. 7 shows the fuel cell run time and the instantaneous device run in the First Example.
Figure 8:
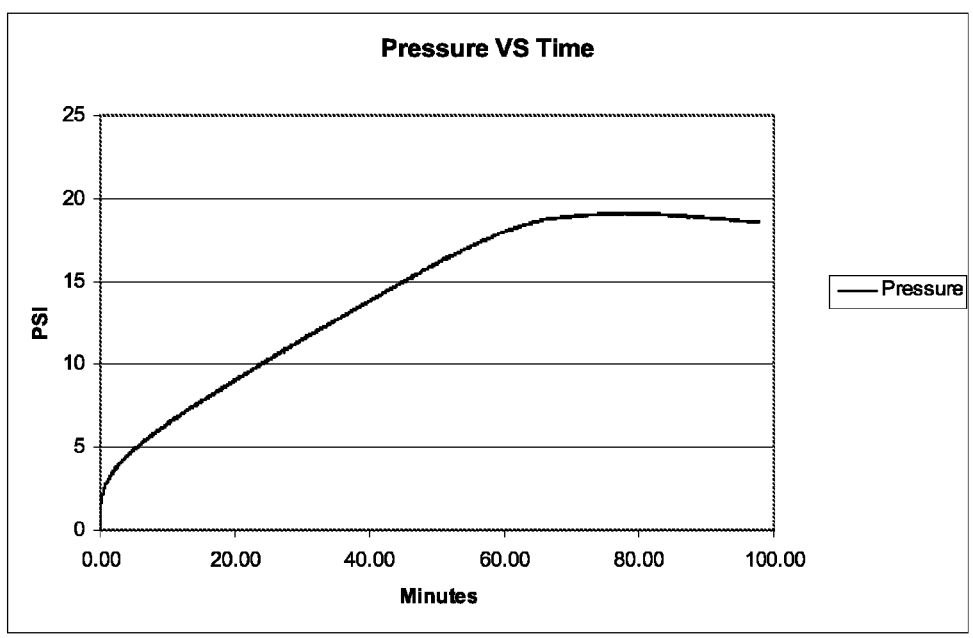
FIG. 8 shows the hydrogen pressure over time in the Second Example.
Figure 9:
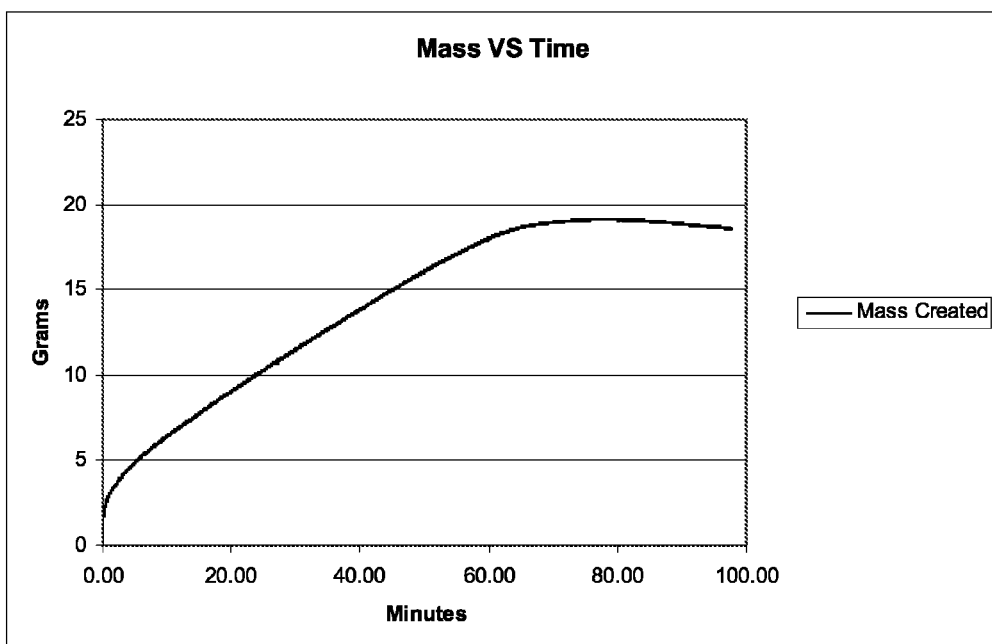
FIG. 9 shows the hydrogen mass over time in the Second Example.
Figure 10:
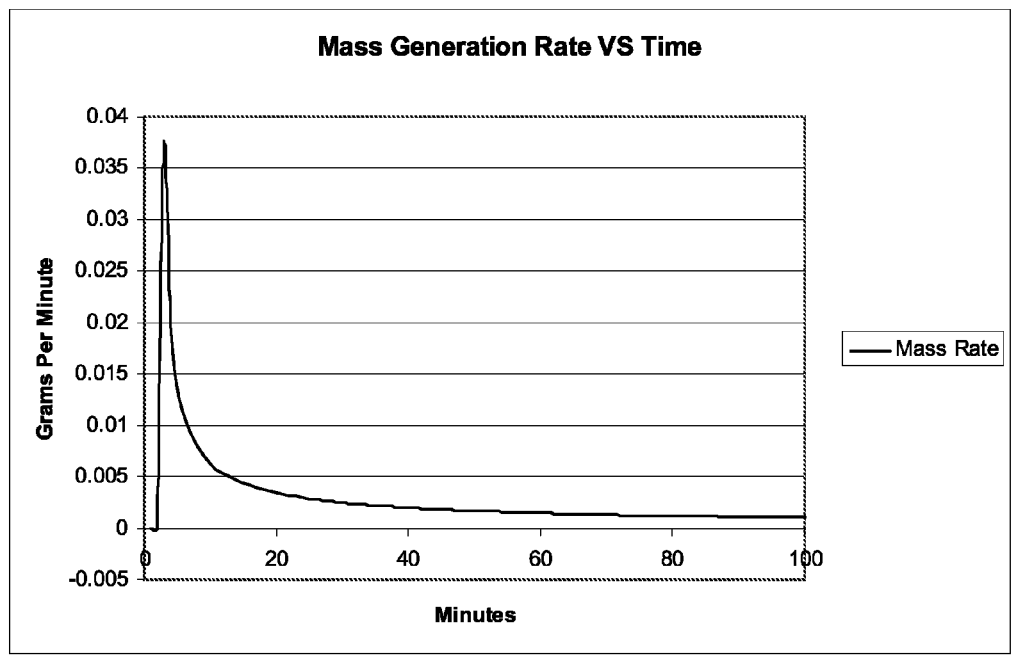
FIG. 10 shows the mass generation rate over time in the Second Example.
Figure 11:
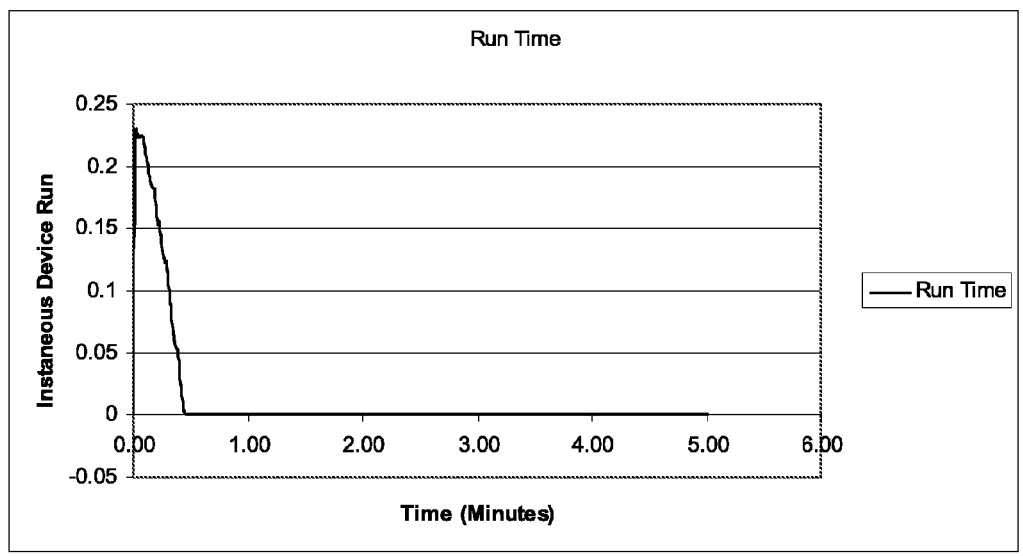
FIG. 11 shows the fuel cell run time and the instantaneous device run in the Second Example.

In one example, assuming a convenient fuel cell consumption rate, the fuel cell run time and by extension the electronic device run time from the above reaction is shown in FIG. 7.

The run time curve indicates that at one minute after the reaction started, the fuel cell or device run time is about 6 minutes. At two minutes after the reaction, the fuel cell or device run time is about 4.8 minutes; at three minutes after the reaction, the fuel cell or device run time is about 3.6 minutes. This curve can be thought of as a type of fuel gauge showing the remaining hydrogen fuel. In this example, after approximately six minutes another reaction is needed to provide the fuel cell or electronic device with continuous fuel.

The volume or mass of the liquid reactant can be reduced, so long as the pressure curve, the mass generation rate curve and/or the run time curve do not change significantly in accordance to the disclosure of the present invention. Alternatively, the pressure generation rate, the mass generation rate and run time can be balanced against the need for reduction in volume. In other words, the pressure generation rate, the mass generation rate and run time can be decreased to a point where volume of the hydrogen generating apparatus is minimized. In accordance to one embodiment of the present invention, energy density can be maximized without attaining the highest possible reaction efficiency.

SECOND EXAMPLE

In contrast to the first example, a dose of the prepared liquid reactant was added to a larger dose of the solid sodium borohydride. A 0.31 gram dose of the prepared liquid reactant was applied onto 2 grams of sodium borohydride. The amounts were chosen to allow direct contact of all the prepared liquid reactant to the sodium borohydride. A larger amount of sodium borohydride is not necessary, because the liquid cannot physically contact more of the solid reactant. The results reported below are limited to the present formulation and other formulations may have improved or better results and utility. The pressure, mass, mass generation rate and run time curves were generated similar to the procedures described above, and are shown in FIGS. 8-11.

These graphs show that for the second example, it took approximately 70 minutes, which is considerably longer than in the first embodiment, to reach the maximum pressure of about 19.1 psi, which is a considerably lower pressure than in the first example. The rate of mass generation remains significant after 20 minutes and also after 40 minutes. Significantly, the run time is only about 0.2 minutes immediately after the reaction started, and the total run time is less than about half a minute after the initial reaction. The results show that adding a small amount of liquid reactant to sodium borohydride releases only a small amount of hydrogen, and to properly power a fuel cell or electronic device the liquid reactant needs to be added continuously or continually.

Another result derived from these two examples shows that for the first example, the maximum attained pressure of 43.8 psi correlates to a total generated hydrogen of about 0.01737 gram for 0.1 gram of sodium borohydride based on the ideal gas equation. In other words, 0.1737 gram of hydrogen is produced for 1.0 gram of sodium borohydride, or about 81.5% of the ideal released hydrogen from the above mass balance equation. For the second example, the maximum attained pressure of 19.1 psi correlates to about 0.00759 gram of hydrogen for 0.31 gram of prepared liquid reactant or water based on the ideal gas equation. Hence, based on the above mass balance equation, 0.31 gram of water should ideally provide 0.069 gram of hydrogen. The 0.00759 gram of hydrogen produced in the second example reaches only about 11% efficiency.

Hence, it has been demonstrated that the efficiency of adding solid sodium borohydride to a larger amount of water is significantly better than adding water to a larger amount of solid sodium borohydride, 81.5%:11% or about 7.4:1.

In accordance with another aspect of the present invention, the weights and volumes of reactants carried in a hydrogen generating apparatus are minimized to increase the density of released hydrogen per amount of reactants carried in the hydrogen generating apparatus. This is accomplished by reducing the weight ratio of solid sodium borohydride to liquid reactant closer to the ideal ratio of 1:0.952. The weight ratio can be reduced when the pH of the liquid reactant is more acidic.

In accordance with another aspect of the present invention, when two liquid reactants having different pH values are reacted with the same amount of sodium borohydride, the reaction with the lower pH liquid reactant should be faster than the reaction with the higher pH liquid reactant, when other factors are substantially the same.

It has been discovered that if the liquid reactant is neutral, i.e., water at pH of 7, the reaction between sodium borohydride and water can take up to one week to fully complete. When the pH of the liquid reactant is reduced to about 5.4, the reaction can take up to about 20 minutes to fully complete. When the pH of the liquid reactant has a pH of about 1.5, the reaction can take less than about 1 minute to substantially or fully complete.

Additionally, when the pH is brought down to lower than 1.0, the efficiency of hydrogen released from the reaction is also improved as shown in the examples below.

THIRD EXAMPLE

In this example, the liquid reactant is prepared as follows:

| | | |
|---|---|---|
| Distilled $H_2O$ | 7.25 grams | |
| $CH_3OH$ | 1.00 gram | |
| $CoCl_2$ | 0.34 gram | |
| $H_2SO_4$ | 0.90 gram | (90-92% concentration) |
| Total | 9.49 grams | |

This prepared liquid reactant has a measured pH of about 0.15. The prepared liquid has a volume of about 9.18 ml (or cc) based on known specific gravities of the liquids. Doses of 1 ml (1.03 grams), 0.75 ml (0.78 gram) and 0.5 ml (0.52 gram) of the prepared liquid reactant were prepared and mixed with 0.1 gram of sodium borohydride in a mixing chamber with a volume of about 70 ml. The following results were obtained.

| $NaBH_4$ | Liquid Reactant | Max pressure | $H_2$ produced (ideal = 0.0213 g) | Efficiency |
|---|---|---|---|---|
| 0.1 gram | 1.03 grams | 55 psi | 0.02233 gram | ~100% |
| 0.1 gram | 0.78 gram | 55 psi | 0.02233 gram | ~100% |
| 0.1 gram | 0.52 gram | 50 psi | 0.02018 gram | ~90% |

The results in the above table suggest that more hydrogen than the hydrogen stored in the sodium borohydride and water was released. This can be caused by possible experimental uncertainty from the measuring equipment or the lab equipment. Also, other compounds in the additives, namely methanol and sulfuric acid, may contribute hydrogen during the reaction to boost the total hydrogen output. Nevertheless, the results clearly show that all of the hydrogen (100%) stored in the sodium borohydride and in a corresponding stoichiometric amount of water was released during the reaction.

As shown, when the pH is reduced to less than 1.5 or more preferably in the range of about 0.15, the optimal weight ratio of sodium borohydride to liquid reactant for efficient hydrogen production is between 1:5.2 and 1:7.8 (when compared to the ideal hydrogen production). These ratios are significantly closer to the ideal ratio of 1:0.92 than the ratio of 1:173 shown in the first example.

Additionally, in the third example the same results can be obtained by adding the solid reactant to the liquid reactant or vice versa.

As stated above, density of recoverable or releasable hydrogen per volume of reactants carried in the cartridge or hydrogen generating apparatus is an important factor in cartridge design. Thus, reduction in volume of reactants while maintaining the high hydrogen production efficiency is desirable, i.e., maximizing energy density.

Hence, it has been shown that lowering the pH of the liquid reactant can increase the density of releasable hydrogen per volume of reactants, while maintaining high efficiency of hydrogen production.

FIG. 1 shows an exemplary hydrogen generating apparatus 127. Apparatus or cartridge 127 includes a portion of solid fuel component 107 held in a chamber adjacent a chamber filled with a liquid fuel component 122. Either fuel component may be any fuel component described herein, such as using sodium borohydride for solid fuel component 107 and water, catalyst and additives as liquid fuel component 122. Solid fuel component 107 and liquid fuel component 122 are separated by a thin frangible membrane 104. A rod 103 is in contact with solid fuel component 107, extends through a fuel conduit 113, and out of apparatus 127 through a cap 105. Rod 103 can move toward solid fuel component 107 a small amount when impacted by a sufficient force. O-ring 102 cushions the impact and seals the aperture. When rod 103 is struck, rod 103 pushes solid fuel component through frangible membrane 104 into liquid fuel component 122. A void 109 may also be provided below liquid fuel component 122 and separated therefrom by a flexible membrane 108, such as a thin sheet of rubber or urethane. Void 109 allows the greater volume of liquid fuel component 122 due to the addition of solid fuel component 107 to expand adequately. As fuel components 107, 122 react, fuel gas is produced. The fuel travels through fuel conduit 113 and out to a fuel reservoir (not shown) to replenish the fuel gas therewithin. Apparatus 127 further includes a base portion 111.

Other suitable gas generating apparatus usable with the fuels described herein are discussed in two (2) commonly-owned co-pending provisional applications both entitled "Hydrogen Generating Fuel Cell Cartridges" having Ser. Nos. 60/689,538 and 60/689,539, filed Jun. 13, 2005. The '538 and 539 provisional applications were filed on the same day as the provisional application entitled "Fuels for Hydrogen Producing Cartridges," having Ser. No. 60/689,572, also filed on Jun. 13, 2005. The present application claims priority to the '572 provisional application. These provisional applications are incorporated herein by reference in their entireties.

Other suitable gas generating apparatus include those described in commonly owned U.S. patent application publication number 2005/0074643, and in U.S. patent application entitled "Hydrogen Generating Fuel Cell Cartridges," bearing Ser. No. 11/067,167, filed on Feb. 25, 2005, and in United States patent application entitled "Hydrogen-Generating Fuel Cell Cartridges," bearing Ser. No. 11/327,580, filed on Jan. 6, 2006. These non-provisional applications are also incorporated by reference in their entireties.

Another suitable gas generating apparatus is illustrated in FIGS. 2 and 3. As shown, gas generating apparatus 200 has housing 202, which is generally cylindrical. However, housing 202 can have any shape. Housing 202 is connected to sealing end cap 204 on one end and to end cap 206 at the other end, as shown. End cap 206 defines flow channel 208 to allow the hydrogen gas produced within apparatus 200 to flow to a fuel cell (not shown). Channel 208 is fluidly connected to a shut-off valve 210 to control the flow of hydrogen out of the apparatus. When valve 210 is turned off, apparatus 200 is sealed. Any shut-off valve can be used. Suitable shut-off valves include those described in commonly owned U.S. patent application publication numbers 2005/0022883 and 2005/0116190, and in commonly owned U.S. patent application Ser. No. 10/978,949, filed on Nov. 1, 2004, Ser. No. 10/958,574, filed on Oct. 5, 2004, and 60/699,865, filed on Jul. 18, 2005. These references are incorporated herein by reference in their entireties.

Within housing 202 is disposed fuel carrier 212, which in a preferred embodiment is fixed relative to housing 202. Fuel carrier 212, as shown in FIG. 3, has a profile of a cross with one of the four orthogonal segments carrying a plurality of fuel capsules or ampoules 214. Fuel carrier 212 can have any shape or profile, as long as fuel carrier 212 has openings to allow the produced hydrogen gas to flow toward end cap 206 and channel 208, and to allow the produced gas to exert pressure on automatic shut-off mechanism 216, as described below. Such openings can be spaces 218 between the orthogonal segments of the cross profile shown in FIG. 3. Also, as illustrated, fuel capsules 214 are carried by only one of the four orthogonal segments. However, fuel capsules 214 can by carried by any portion of the fuel carrier 212 and can be carried by all the segments of fuel carrier 212.

Each fuel capsule 214 comprises a solid fuel component 107 and a liquid fuel component 122 separated by membrane 104, similar to those in gas generating apparatus 127 shown in FIG. 1. Once membrane 104 is torn or otherwise ruptured, the solid and liquid fuels/reactants are mixed to produce hydrogen, as described above. The amounts of liquid and solid fuels are pre-measured or pre-determined to maximize the hydrogen produced, also as described above.

Fuel carrier 212 also includes coil spring 220. One end of coil spring 220 is located in pocket 222 of shut-off mechanism 216, and coil spring 220 extends to connect to membranes 104 in all fuel capsules 214. As assembled, coil spring 220 is pre-loaded, so that it has a tendency to coil into pocket 222. As the spring coils, it ruptures membranes 104 and the fuel capsules 214 sequentially by hooks or similar devices, until the coiling action is stopped or when the spring fully recoils into pocket 222.

Shut-off mechanism 216 has flexing arm or arms 224. Arm 224 defines slot 223, and fuel carrier 212 has extension 225 which carries pin 225a. Pin 225a is received in slot 223, so that when shut-off mechanism 216 is moved toward end cap 204, arm 224 is flexed downward. When shut-off mechanism 216 moves away from end cap 204, arm 224 is flexed upward. When arm 224 is sufficiently flexed downward toward the coils of spring 220 in pocket 222, it touches or contacts the spring to arrest the coiling action.

Shut-off mechanism 216 is spaced from end cap 204 by spacing 226, which is filled with a gas or a compressed gas, such as air, nitrogen or hydrogen. The gas 227 in spacing 226 acts like a gas spring. When hydrogen is produced faster than it can be consumed or when valve 210 is closed, the internal pressure inside housing 202 increases. This pressure acts on shut-off mechanism 216 tending to push it toward end cap 204 against gas spring 227. When this internal pressure exceeds a predetermined threshold, arm 224 presses on coil spring 220 to stop the coiling action and the rupturing of membrane 104. Hence, the production of hydrogen stops. When valve 210 is opened, the hydrogen gas is transferred or produced from housing 202, thereby reducing the internal pressure in gas generating apparatus 200. As the internal pressure is decreased, gas spring 227 pushes shut-off mechanism away from end cap 204 and arm 224 is moved away from coil spring 220 to allow the coiling action to resume.

In this embodiment, shut-off mechanism 216 automatically stops the production of gas by stopping the reactions caused by the rupturing of additional membranes 104, when the internal pressure of gas generating apparatus 200 reaches a predetermined threshold. When the internal pressure drops below this threshold, the shut-off mechanism automatically allows the production of gas to resume by continuing the rupturing of membranes 104 of unreacted fuel capsules 214.

Gas spring 227 can be replaced by other springs, such as helical springs, compressed foams or other springs. Advantageously, gas generating apparatus 200 contains only two moving parts, i.e., shut-off mechanism 216 and coil spring 220. Also, when gas generating apparatus 200 is first assembled or before the first use, the gas generating apparatus 200 can be charged with a pressurized gas, such as hydrogen, to activate shut-off mechanism 216 to prevent coil spring 220 from recoiling until a user opens valve 210 for the first time. Additionally, pocket 222 can be formed separately from shut-off mechanism 216, so that this pocket remains stationary when the shut-off mechanism moves.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A gas generating apparatus comprising
   a housing,
   a metal hydride,
   a liquid reactant comprising water,
   a plurality of fuel capsules, wherein each fuel capsule comprises a pre-determined amount of the metal hydride and a pre-determined amount of the liquid reactant separated by a membrane, and
   a moving element capable of rupturing the membranes so that the metal hydride and the liquid reactant can react to produce hydrogen gas.

2. The gas generating apparatus of claim 1 further comprising an automatic shut-off mechanism, said shut-off mechanism is responsive to an internal pressure of the gas generating apparatus, such that when the internal pressure reaches beyond a predetermined threshold pressure the shut-off mechanism stops the moving element from moving.

3. The gas generating apparatus of claim 2 wherein the shut-off mechanism is supported by a support spring, such that the support spring acts on the shut-off mechanism to balance the internal pressure.

4. The gas generating apparatus of claim 3, wherein the support spring provides the predetermined threshold pressure.

5. The gas generating apparatus of claim 4, wherein when the internal pressure exceeds the predetermined threshold pressure, the shut-off mechanism moves in a first direction to stop the moving element.

6. The gas generating apparatus of claim 5, wherein the internal pressure is below the predetermined threshold pressure, the shut-off mechanism moves in a second direction to allow the moving element to move.

7. The gas generating apparatus of claim 1, wherein the moving element comprises a coil spring.

8. The gas generating apparatus of claim 7, wherein the coil spring comprises a hook to rupture the membrane.

9. The gas generating apparatus of claim 8, wherein the coil spring is pre-loaded, such that as the coil spring moves the hook ruptures the membrane.

10. The gas generating apparatus of claim 1, wherein the plurality of fuel capsules are stationary relative to the housing.

* * * * *